Figure 1:
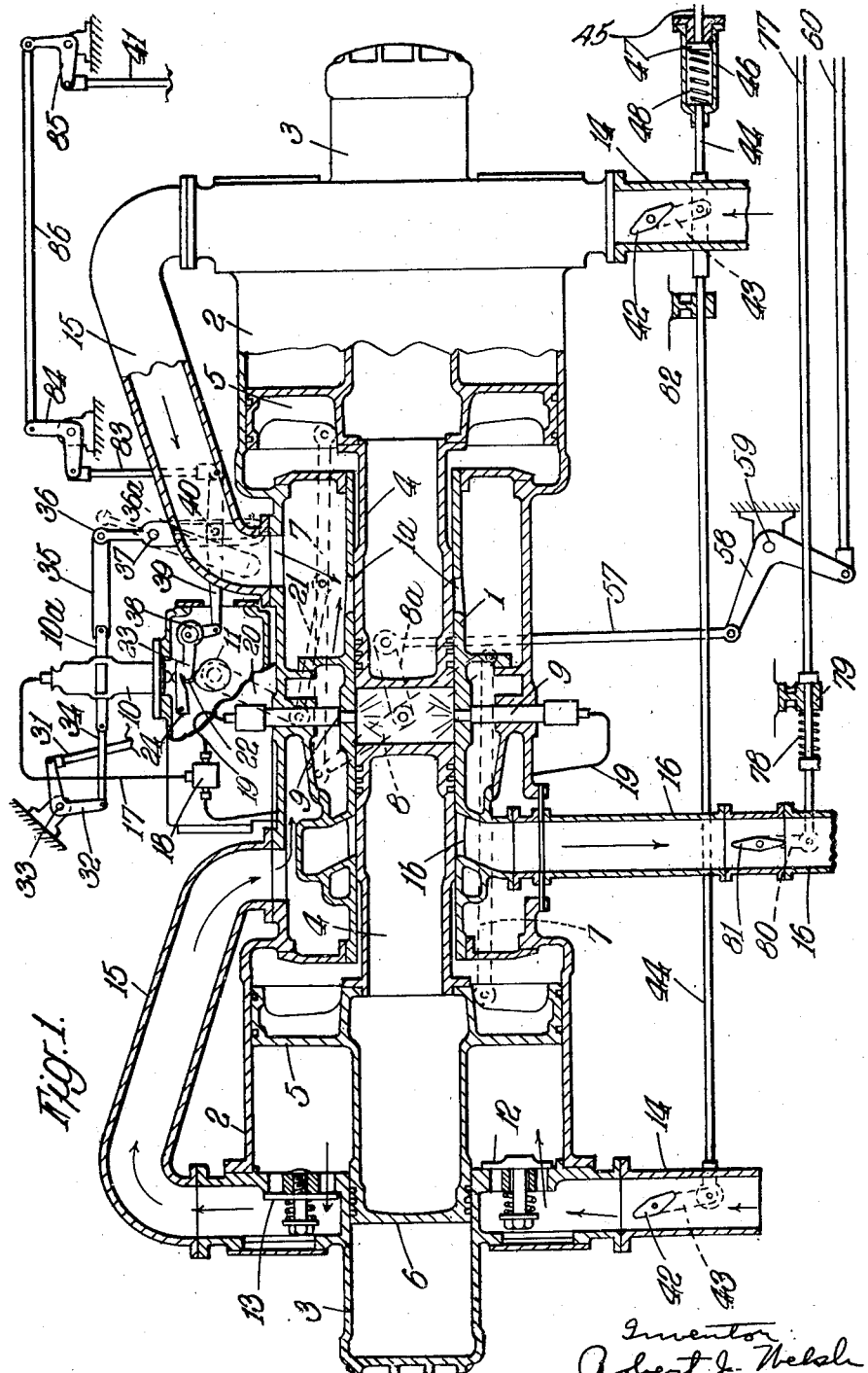

Dec. 27, 1949   R. J. WELSH   2,492,546
GOVERNING OF FREE PISTON TYPE INTERNAL-COMBUSTION COMPRESSORS
Filed Dec. 3, 1943   3 Sheets-Sheet 1

Inventor
Robert J. Welsh
by Richard E. Babcock
Attorney

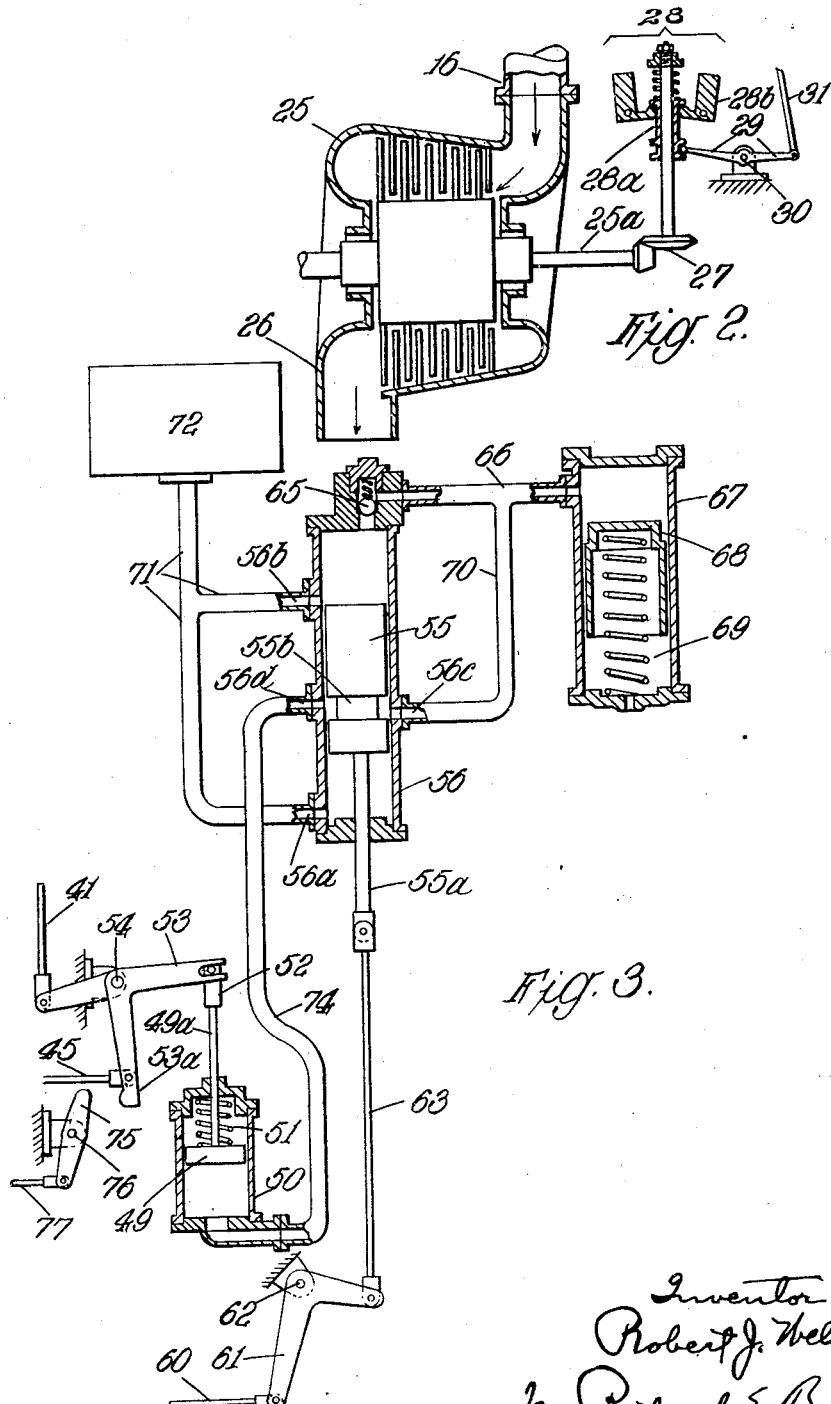

Dec. 27, 1949     R. J. WELSH     2,492,546
GOVERNING OF FREE PISTON TYPE INTERNAL-COMBUSTION COMPRESSORS
Filed Dec. 3, 1943     3 Sheets-Sheet 3

Inventor:
Robert J. Welsh
by Richard E. Babcock
Attorney

Patented Dec. 27, 1949

2,492,546

UNITED STATES PATENT OFFICE 2,492,546

GOVERNING OF FREE PISTON TYPE INTERNAL-COMBUSTION COMPRESSORS

Robert James Welsh, Rugby, England, assignor to The English Electric Company Limited, London, England, a British company Application December 3, 1943, Serial No. 512,835
In Great Britain September 30, 1942

7 Claims. (Cl. 60—13)

1

This invention relates to a free piston type internal combustion compressor i. e. a device wherein a compressor piston is directly connected to or combined with an internal combustion engine piston instead of being driven thereby through connecting rods, cranks and crankshafts. There are usually two opposed engine pistons reciprocable towards and away from each other in one cylinder; the engine is usually one operating on a two-stroke compression-ignition cycle, some or all of the air from the compressor serving to scavenge and charge the engine cylinder.

A device of this kind may be used as a gas-generator to supply another piece of apparatus such as a gas turbine, which may have as its working fluid either (i) solely air coming direct from the compressor or (ii) solely the exhaust from the engine cylinder (comprising the products of the combustion in the engine cylinder mixed with the scavenging air supplied to the engine by the compressor) or (iii) a mixture of the engine exhaust with air coming direct from the compressor. The second of these three alternatives is most usual.

If a free piston type internal combustion compressor be used as a gas generator to supply motive fluid to a prime mover (hereinafter referred to as a turbine since it will usually take that form), some arrangement is necessary for controlling the output of the compressor in accordance with the load imposed on the turbine in order to prevent excessive speed fluctuations of the latter or alternatively in some cases such as when the turbine is coupled to a ship's propeller the output of the compressor may require to be regulated in order that the turbine may run at various chosen speeds; since such an arrangement will usually consist of or include some form of speed governor driven by the turbine it will hereinafter be given the comprehensive term "turbine governor."

According to the present invention the turbine governor directly controls the energy input to the engine and hence the power output of the plant (e. g. by controlling the fuel supply to the engine cylinder of the gas-generator) while means responsive to the stroke of the free piston govern this stroke by regulating the volumetric efficiency of the compressor (e. g. by controlling a throttle valve in the inlet to the compressor). A device actuated by the free piston may, for example, control operating means for the compressor inlet throttle in accordance with the position reached by the free piston at the end of the expansion stroke of the engine, which point may conveniently be called the outer dead centre, and in a sense to limit the variation in the position of this point, but alternatively and preferably the device sets the operating means for the inlet throttle in motion so long as there is any appreciable deviation of the outer dead centre from a predetermined point and in such a sense as to tend to restore the outer dead centre to the predetermined point.

According to a further feature of the invention the device responsive to the stroke of the free piston acts also on a further throttle at the outlet from the gas-generator, between the gas-generator and the turbine, to check temporary excessive outward movement of the free piston. According to yet another feature of the invention the point at which combustion of fuel in initiated during the compression stroke of the piston in the engine cylinder is automatically varied in accordance with the relationship between the quantity of fuel to be injected and the volumetric efficiency of the compressor.

Figure 4:
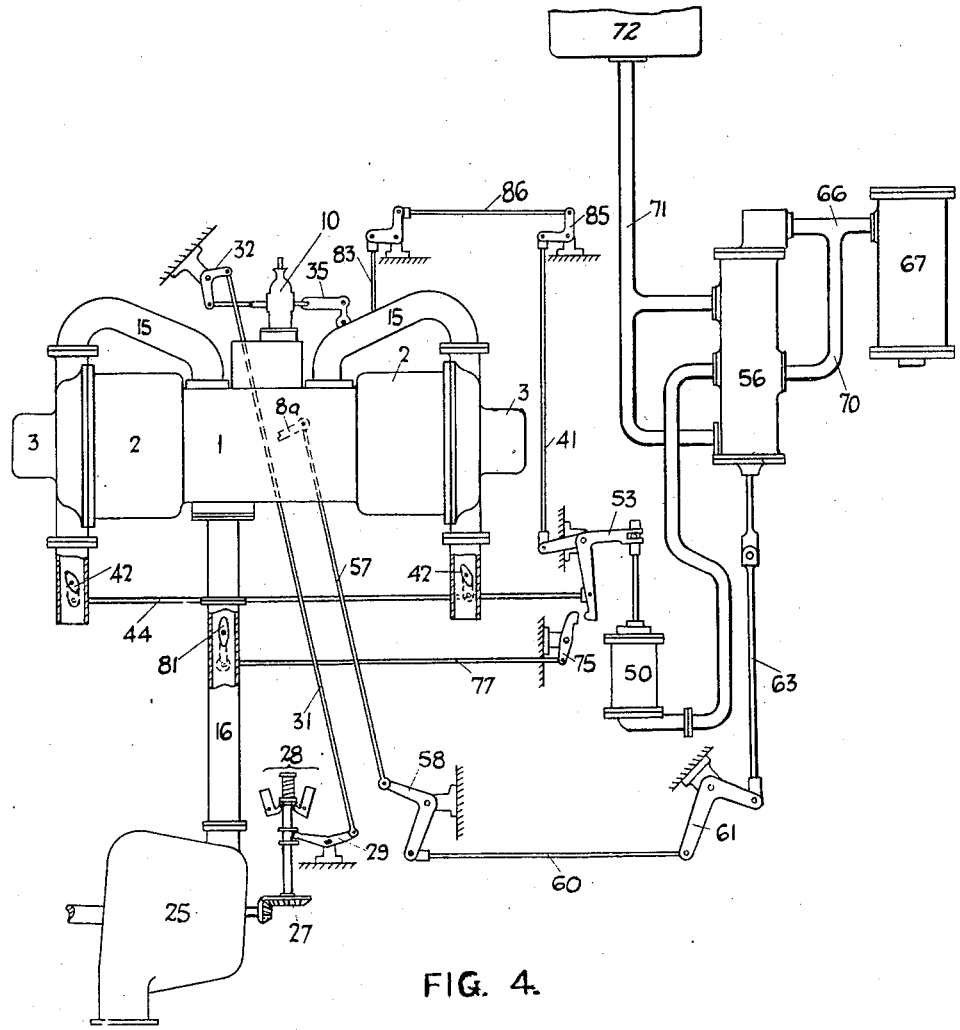

One complete plant according to the invention is shown in the accompanying drawings Figs. 1, 2, 3 and 4 of which Fig. 1 shows an axial cross section through the free piston gas-generator, Fig. 2 shows the turbine and governor partly in section, Fig. 3 shows parts of the control mechanism also partly in section while Fig. 4 indicates diagrammatically the entire plant. It will be understood that Figs. 1 to 3 taken together show the complete plant, the conduit 16 of Fig. 2 being connected to the conduit 16 of Fig. 1, the link 41 of Fig. 3 being connected to the link 41 of Fig. 1, the link 31 of Fig. 2 to the link 31 of Fig. 1 and the links 45, 60 and 77 of Fig. 3 to the similarly numbered links of Fig. 1.

The body of the free piston type internal combustion compressor comprises the engine cylinder 1, the pair of compressor cylinders 2 at opposite ends thereof and the pair of buffer cylinders 3 at the extreme outer ends. Within the engine cylinder 1 reciprocate the opposed engine pistons 4, each of which forms a free piston unit with one of the compressor pistons 5 reciprocating in the cylinders 2 and one of the buffer pistons 6 reciprocating in the cylinders 3. The head of each of the compressor cylinders 2 is provided with at least one inlet valve 12 of conventional form— i. e. a valve which opens only when the pressure inside the cylinder falls below a predetermined value—and at least one discharge valve 13 of conventional form—i. e. a valve which opens only when the pressure inside the cylinder exceeds a predetermined maximum. The valves 12 put each of the compressor cylinders 2 in communication with an inlet conduit 14 while the valves 13 put the compressor cylinders 2 in communication with the conduits 15 communicating with the annular space surrounding the ring of inlet ports 1a in the engine cylinder 1. The latter is provided also with a ring of exhaust ports 1b opening into an annular space with which communicates the exhaust conduit 16.

The reciprocating piston units are synchronized in the well known and usual manner by being linked by the pair of links 7 to opposite ends of the lever 8 having its mid point pivotally supported on the outside part of the engine cylinder 1.

Fuel can be injected into the cylinder 1 by fuel injectors 9 of conventional form supplied in usual manner through fuel pipe 17, the usual form of distributor 18 and the fuel pipes 19, by the fuel injection pump 10 of conventional form reciprocated by cam 11 which is oscillated (in accordance with the movement of the free piston units) by the lever 20 which is connected by link 21 to a point on one of the links 7; the quantity of fuel injected by each stroke of the injection pump 10 is determined in the usual manner by the position of its fuel rack 10a.

The conduit 16 connects the engine exhaust to the inlet to the turbine 25 which exhausts to the exhaust pipe 26. The turbine shaft 25a drives—through gearing 27—a conventional form of centrifugal speed governor 28.

The power plant so far described is of well known kind. It has been proposed to control the gas-generator of such plant by the turbine governor in various ways and in particular to provide at the inlet to the compressor a throttle actuated by the turbine governor to decrease the flow through the compressor on an increase in turbine speed and vice versa, the fuel rack being moved either by the turbine governor or by one of the free piston units to vary the quantity of fuel injected per cycle in accordance with either the turbine speed or the piston stroke. In contradistinction to this the present invention is carried out by putting the quantity of fuel injected under the control of the turbine governor while the compressor is provided with an inlet throttle controlled by means responsive to piston stroke.

Thus the sleeve 28a actuated by the weights 28b of the governor 28 is connected to the fuel rack 10a (by a linkage made up of the lever 29 pivoted at 30, the link 31, the lever 32 pivoted at 33 and the link 34) in such a sense that on outward movement of the weights 28b in response to an increase in the speed of the turbine shaft 25a the sleeve 28a moves the fuel rack 10a to decrease the fuel injected per cycle by the fuel injection pump 10.

A throttle valve 42 at the inlet to each compressor cylinder 2 can be oscillated by the lever 43 pivotally connected to the link 44 which is in turn connected to the link 45 by the spring link comprising spring 48 compressed between members 46 and 47 secured to the links 44 and 45 respectively, one of these members being hollow to contain the other and the spring 48.

The links 44 and 45 and hence the throttle valves 42 can be moved by the fluid pressure servo-motor comprising the piston 49 reciprocable under fluid pressure in the cylinder 50 against the force of the compression spring 51. A link 52 pivotally connected to the piston rod 49a of the piston 49 engages one arm of a bell crank lever 53 mounted on fixed pivot 54, the other arm of which lever is pivotally connected to the end of the link 45. Upward movement of the piston 49 under fluid pressure will thus move the throttle 42 in the closing direction.

The servo-motor made up of piston 49 in cylinder 50 is controlled by means directly actuated by the free piston units. These means comprise a control piston 55 reciprocable in a control cylinder 56 and driven (through the arm 8a of the lever 8, the link 57, the lever 58 turning about the fixed pivot 59, the link 60, the lever 61 turning about the fixed pivot 62, the link 63 and the piston rod 55a) by the pistons 5 so as to reciprocate therewith. The inner end of the cylinder 56 is connected through the non-return valve 65 and the pipe 66 to a hydraulic accumulator—i. e. an expandible chamber wherein energy is stored under pressure and shown as comprising a cylinder 67 containing a piston 68 loaded by the spring 69. The cylinder 56 has its outer end in communication through port 56a and a point at its inner end through port 56b in communication through pipe 71 with a liquid storage tank 72. The cylinder is also provided with ports 56c and 56d located as shown relatively to each other and to a groove 55b in the piston 55; the port 56c communicates through the pipe 70 with the pipe 66 and cylinder 67 while the port 56d communicates with the servo-motor cylinder 50.

When each throttle valve 42 is fully open, link 44 is arrested by engagement of an enlargement thereon with the guide 82 through which this link slides but compression of the spring 48 permits further movement of the link 45 together with servo piston 49 and lever 53. Located adjacent to the lever 53 so as to be engaged by the end 53a after considerable movement thereof in the direction to open the inlet throttles 42 is the lever 75 turning about the fixed pivot 76 to move the link 77 against the biassing action of the spring 78 compressed between a collar or enlargement on the link 77 and the fixed guide 79 to close a throttle 81 in the conduit 16 between the exhaust outlet from the gas-generator and the inlet to the turbine 25.

The cam 11 acts on the fuel injection pump 10 through two intermediate members. Bearing on the cam is the roller 22 on the end of the lever 23 and between roller 22 and the fuel injection pump is the lever 24. Thus the lever 23 constitutes a follower which is reciprocated by the cam and which drives the fuel pump; any adjustment of the relative positions of the follower, lever 23 and the cam 22 will result in the stroke commencing at different angular positions of the cam and will so adjust the timing of the fuel injection. According to a further feature of the invention, the timing of the initiation of combustion in the engine cylinder is made to depend upon the relationship between the quantity of fuel to be injected and the volumetric efficiency of the compressor—e. g. by being made to depend upon the relationship between the position of the fuel rack 10a and the position of the inlet throttle valve or valves 42. For this purpose a link 35 connects the fuel rack 10a to a slotted lever 36 which can oscillate about fixed pivot 37 while the pivot about which oscillates the lever 23 is in the form of an eccentric 38 which can be oscillated by the lever 39 pivotally connected at one end to the eccentric, at an intermediate point to the slider 40 slidable in the slot 36a in the lever 36 and at the other end to the link 83 connected by levers 84 and 85 and the link 86 to the link 41 going to one of the arms of the lever 53 which actuates the inlet throttle valves 42.

The manner of operation of the plant is as follows:

When the free piston units approach the inner dead centre position as shown in Fig. 1, air is compressed in the engine cylinder 1 between the pistons 4 to a temperature at which injected fuel will ignite while the cam 11 acting through the levers 23 and 24 operates the fuel pump 10 to inject into this compressed air (through the injection valves 9) a quantity of fuel which is determined by the position of the fuel rack 10a. During the outward stroke of pistons 4 and 5 following on the combustion of this fuel, the pistons 5 compress in the cylinders 2 the air previously drawn in through the inlet valves 12 which now close. When the free piston units come to rest at the end of this outward stroke, one of the pistons 4 uncovers the inlet ports 1a and the air compressed in the cylinders 2 goes through the non-return valves 13 as shown by the arrows through the conduits 15 to the inlet ports 1a so scavenging the engine cylinder. The other piston 4 has also uncovered the exhaust ports 1b so that the mixture of combustion products and scavenging air goes by way of conduit 16 to the inlet to the turbine 25 to serve as the motive fluid for this turbine and eventually is discharged by the turbine exhaust 26. The buffer pistons 6 during this outward stroke compress air in the buffer cylinders 3 until the piston units are brought to rest and when scavenging of the engine cylinder takes place the pressure in the buffer cylinders 3 causes the piston units to rebound and return to the inner dead centre position, thereby trapping and compressing in the engine cylinder 1 some of the scavenging air while at the same time the compressor pistons 5 draw into the cylinders 2 a fresh charge of air through the non-return inlet valves 12 from the inlet pipes 14. The operation so far described is well known and is described solely for the sake of completeness.

To control the plant, the turbine governor 28 driven by the turbine shaft 25a will act in response, for example, to a decrease in turbine speed to move the fuel rack 10a (through the linkage made up of parts 29—34) in a direction to increase the quantity of fuel injected into the engine cylinder 1 per cycle. This, by increasing the energy input to the gas-generator, will increase the power output thereof and the input to the turbine and tend to restore the turbine speed to the correct value. This increase of fuel may, however, have an immediate disturbing effect on the stroke of the free piston and may, for example, cause the outer dead centre to move outwards. Changes in other conditions may also affect the outstroke of the free pistons—e. g. a considerable decrease in the back pressure in conduit 16 or a fall of this pressure substantially to atmospheric would increase the outstroke.

A variation in the position of the outer dead centre is highly undesirable. An excessive stroke may cause excessive pressure in buffer cylinders 3 or even impact of pistons 6 with the cylinder ends. If, on the other hand, the pistons 5 stop considerably short of a preferred outer dead centre point the excessive quantity of gas left in the clearance spaces in cylinders 2 at substantially the pressure prevailing in conduit 16 will tend to increase the inward return stroke of the free piston units and at high gas discharge pressures this may so considerably outweigh the reduction in buffer pressure in cylinders 3 with reduced stroke that there is a tendency to a seriously excessive compression pressure in the engine cylinder 1 when engine pistons 4 reach the inner dead centre. Thus variations in the position of the outer dead centre will vary the engine compression pressure, and vary this pressure to an extent varying with changes in the pressure in the outlet conduit 16. There is one particular outer dead centre position at which the variation of engine compression pressure with changes in discharge pressure are a minimum and it is highly desirable that the outer dead centre should deviate as little as possible from this position; moreover with a constant dead centre the effect of buffer pistons 6 will remain substantially constant. The arrangement according to the invention aims firstly at keeping the outer dead centre substantially invariable and furthermore of acting independently of the action of the governor on the fuel rack 10a, thereby checking any changes in stroke at constant fuel injection; the arrangement acts as follows:—

An outward movement of the outer dead centre causes the piston 55 moved by the free piston units (through the linkage comprising the parts 57—63) to actuate the servo-motor piston 49 in a sense to open the throttle valves 42. The piston 55 is shown in the position which it occupies when the free piston units are at their inner dead centre position and the cylinder 56 is then kept filled with liquid at constant head through the pipes 71 from the storage tank 72. During the outward stroke of the free piston units, the control piston 55 covers the port 56b and tends to force liquid out of the cylinder 56 through the non-return valve 65 and pipe 66 into the accumulator cylinder 67 where it is stored under a pressure determined by the spring 69. At the end of the outward stroke, the end of the piston 55 should uncover the port 56c without uncovering the port 56d if the pistons come to rest at the correct outer dead centre position. At the end of the return stroke of piston 55 the accumulator cylinder 67 is put in communication through the pipe 70 and the port 56c and through the port 56d and the pipe 74 with the servo-motor cylinder 50. If the stroke of the free piston units is such that they stop slightly short of the predetermined outer dead centre position, the control piston 55 during one stroke will force liquid into the accumulator but the edge of the piston will not uncover port 56c while on the return stroke the groove 55b will uncover the port 56c whereby fluid flows from the accumulator by way of pipes 70 and 74 into the cylinder 50 to move the piston 49 against the pressure of spring 51. Thus on each stroke the whole device will act as a pump supplying liquid to the servo-motor to move it progressively to close the throttle valves 42. When the free piston units, however, stop at the outer dead centre position which is the correct predetermined position, the end of the piston 55 will uncover the port 56c after the liquid has been pumped into the accumulator but without uncovering the port 56d whereby the liquid pumped into the accumulator will immediately return to the cylinder 56; accordingly when on the return stroke the groove 55b in piston 55 uncovers port 56c there will be no flow of liquid from pipe 70 to pipe 74 and to the servo-motor which will accordingly remain at rest. Should the free piston unit move beyond the correct outer dead centre the control piston 55 will move far enough for its end to uncover not only port 56c but subsequently port 56d, thereby allowing the spring 51 to move the piston 49 in a direction to return a certain amount of fluid to the cylinder 56 and to open the inlet throttles 42. Continued running of the free piston device beyond the predetermined outer dead centre thus results in a progressive return movement of the servomotor and progressive opening of the throttles until a state of equilibrium is reached at which the pistons are coming to rest at substantially the correct outer dead centre while on the other hand continued stopping of the free pistons before reaching the predetermined outer dead centre will have the opposite effect.

Thus the turbine governor 28 controls the fuel supply to the engine cylinder while the control device including the control piston 55 responsive to any deviation of the outer dead centre position of the free pistons from a predetermined point controls the inlet throttles in such manner as to tend to maintain a substantially constant stroke of the free pistons and to correct for any deviation of the outer dead centre from the predetermined point either due to a change in the fuel supply or due to any other cause at a constant value of fuel supply. It is an important feature of the arrangement according to the invention that the condition of the inlet throttles 42 is independent of the condition of the turbine governor 28 and is not necessarily dependent on the position of the fuel rack 10a but can vary independently of the fuel supply as may be necessary to maintain the correct stroke of the free pistons. An important point is that for any given quantity of fuel injected per cycle, movement of the inlet throttles 42 will not vary the flow of gas through the gas-generator device. A partial closing of the inlet throttles 42 will reduce the initial pressure of the air drawn into the compressor cylinder and the volumetric efficiency of the compressor below their corresponding values when the throttle is fully open and accordingly for any given quantity of fuel injected per cycle such partial closing of the throttles will tend to increase the stroke of the compressor because due to the lower initial pressure the energy developed by the combustion of the fuel in the cylinder 1 will be in excess of that which would be absorbed in overcoming the resistance of the pistons 5 and 6 when operating over the original length of stroke. Conversely a re-opening of the throttles 42 will increase the initial pressure and the volumetric efficiency, thus tending to decrease the stroke. Varying the volumetric efficiency of the compressor within practicable limits will not substantially affect—for a given fuel injection—either the mass of air drawn into and delivered by the compressor or its delivery pressure; these are determined principally by the quantity of fuel injected per cycle and by the mass flow/pressure characteristic of the turbine supplied by the gas-generator. A further important feature is that the actual position of the throttle valves 42 is independent of the exact point at which the free pistons come to rest at the end of the outstroke and the throttles can be in any position between fully open and fully closed with the pistons coming to rest in one particular position which will only momentarily vary from the correct outer dead centre position.

In general a change in loading on the turbine will cause a gradual tendency to a change of speed, a displacement of the governor and consequently—in immediate response—a gradual change in the quantity of fuel injected which tends to check the change of turbine speed. Similarly, any tendency of the outer dead centre of the free pistons to vary when the gas-generator is adjusting itself to new conditions of load will immediately set the inlet throttles in progressive movement to check any deviation of the outer dead centre and to restore it to substantially the correct point. A sudden large change in conditions such as, for example, a sudden large increase in the load on the turbine resulting in a sudden large increase in the quantity of fuel injected per cycle may result in an increase in the stroke of the free pistons accompanied by a rapid full opening of the inlet throttles without immediately sufficiently restricting the stroke of the free pistons. This emergency condition is met by the action of the end 53a of the lever 53 on the lever 75 whereby the throttle valve 81 at the outlet from the gas-generator is closed to cause an artificial building up of the pressure of this outlet and a resistance to the motion of the free pistons. This will tend further to restrict outward movement of the outer dead centre until the pressure at the turbine outlet builds up when in response to inward movement of the outer dead centre the throttle valve 81 will be progressively fully re-opened by the action of spring 78.

The movement of the fuel rack 10a to vary the quantity of fuel injected will turn the lever 36 through an angle to a new position as indicated by the dotted lines in Fig. 1; this will move the slider 40 and the link 39, thereby turning the eccentric 38 to change the position of the lever 23 and roller 22 relatively to the cam 11. The roller 22 will move around the cam 11, thereby altering the angular position of the cam 11 at which the fuel pump is operated. Thus the fuel timing will be altered with any change in the quantity of the fuel injected per cycle but since the rack 10a is linked to an invariable point on the lever 36, the movement of the eccentric 38 for a given movement of the fuel rack 10a will depend upon the position of the slider 40 in the slot 36a which in turn depends upon the position of the lever 53 to which the arm 39 is linked and thus upon the position of the inlet throttle valves 42 which are actuated by the lever 53. A change in the position of the inlet throttles may have no effect on the timing of the fuel injection when the fuel rack is in one particular position and may advance or retard the timing according to whether the fuel rack is on one side or other of the said position.

What I claim as my invention and desire to secure by Letters Patent is:

1. Power plant consisting of a gas turbine having a speed governor, and of a free piston internal combustion compressor comprising a combustion cylinder, at least one compressor cylinder and at least one cushion cylinder, at least one free piston unit consisting of an engine piston, a compressor piston and a cushion piston adapted to reciprocate in the said cylinders, means for supplying fuel to the said combustion cylinder, means adapted to control the quantity of this fuel supply per stroke in dependence on the said speed governor and in substantial independence of the positions of the dead centres of the free piston unit, means progressively movable responsive to repeated deviations of the outer dead centre positions of said unit from a predetermined point, a throttle at the inlet of the said compressor cylinder, the said progressively movable means being adapted to actuate said throttle so as to progressively open said throttle when the said piston unit repeatedly overruns said predetermined point and to progressively close said throttle when said piston unit repeatedly fails to reach said predetermined point.

2. Power plant according to claim 1 wherein said throttle actuating means comprise a fluid pressure motor in driving connection with the throttle valve and a fluid pump device reciprocated by the free piston device and in communication with said motor, the pump device having ports admitting fluid to the motor from the pump when the stroke of the pump piston during the outstroke of the free piston device is up to a point on one side of a predetermined point and discharging fluid from the motor when the said stroke is up to a point on the other side of the predetermined point.

3. A power plant according to claim 2 in combination with a throttle at the exhaust outlet from the internal combustion device and a lost-motion type operative connection between the two throttles, the said exhaust throttle having a full open position corresponding to the greater part of the range of positions of said inlet throttle and being moved to closed position by said connection after the said inlet throttle has been moved to full open position.

4. Power plant comprising a gas turbine, a free piston internal combustion compressor with its exhaust connected to the inlet to the turbine to supply motive fluid thereto and a speed governor actuated by the turbine, in combination with a fuel regulator on the free piston device under the control of said governor, a throttle at the inlet to said compressor, actuating means for said throttle progressively movable in the throttle-closing direction in response to the free piston ending its outstroke short of a predetermined point and in the throttle-opening direction in response to an excessive outstroke of the free piston device and means for advancing and retarding the timing of the injection of fuel into the free piston device in joint dependence on the position of said fuel regulator and the position of said inlet throttle.

5. A power plant comprising a free piston internal combustion compressor, and a throttle at the inlet to said compressor, in combination with lever mechanism connected to said free piston and actuated thereby, the extent of movement of said lever mechanism being directly dependent upon the extent of the reciprocatory movement of said free piston, a servo-motor, and a fluid medium control means for supplying fluid material under pressure to, and permitting its escape from, said servo-motor, said fluid medium control means comprising a duel function member connected to and actuated by said lever mechanism, said member serving both as a pump element to pump said medium in said fluid medium control means and also as a control means for said fluent medium, preventing its passage to said servo-motor, or permitting its passage under pressure to said servo-motor, or permitting its escape from said servo-motor, all in accordance with the position of said member at the end of a given stroke of said free piston.

6. Power plant comprising a gas turbine, a free piston internal combustion compressor with its exhaust connected to the inlet of the turbine to supply motive fluid thereto and a speed governor actuated by the turbine, in combination with a fuel regulator on the free piston device under the control of said governor, a throttle at the inlet of said compressor and independent of and disassociated from said governor, and means independent of said governor and controlled solely by the stroke of the free piston of said internal combustion compressor to operate said throttle towards its open condition in response to excessive stroke of said piston.

7. Power plant comprising a gas turbine, a free piston internal combustion compressor with its exhaust connected to the inlet of the turbine to supply motive fluid thereto and a speed governor actuated by the turbine, in combination with a fuel regulator on the free piston device under the control of the said governor, a throttle at the inlet of said compressor and independent of and disassociated from said governor, and means independent of said governor and controlled solely by the stroke of a free piston of said internal combustion compressor to operate said throttle towards its closed condition in response to insufficient stroke of said piston.

ROBERT JAMES WELSH.

REFERENCES CITED

The following references are of record in the file of this patent:

UNITED STATES PATENTS

| Number | Name | Date |
| --- | --- | --- |
| 2,090,709 | Steiner | Aug. 24, 1937 |
| 2,102,121 | Janicke | Dec. 14, 1937 |
| 2,147,935 | Steiner | Feb. 21, 1939 |

FOREIGN PATENTS

| Number | Country | Date |
| --- | --- | --- |
| 434,921 | Great Britain | Sept. 11, 1935 |